United States Patent
Tomishige

(10) Patent No.: US 10,856,133 B2
(45) Date of Patent: Dec. 1, 2020

(54) CORE NETWORK NODE, BASE STATION AND METHOD FOR CONTROLLING TERMINAL APPARATUS

(71) Applicant: NEC Corporation, Tokyo (JP)

(72) Inventor: Kazunari Tomishige, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/279,097

(22) Filed: Feb. 19, 2019

(65) Prior Publication Data

US 2019/0306694 A1    Oct. 3, 2019

(30) Foreign Application Priority Data

Mar. 27, 2018    (JP) ................. 2018-059994

(51) Int. Cl.
*H04W 76/00* (2018.01)
*H04W 8/08* (2009.01)
*H04W 72/12* (2009.01)
*H04W 88/08* (2009.01)

(52) U.S. Cl.
CPC ......... *H04W 8/08* (2013.01); *H04W 72/1289* (2013.01); *H04W 88/08* (2013.01)

(58) Field of Classification Search
None
See application file for complete search history.

(56) References Cited

U.S. PATENT DOCUMENTS

| | | |
|---|---|---|
| 2010/0075635 A1 | 3/2010 | Lim et al. |
| 2015/0208322 A1* | 7/2015 | Lim ...................... H04W 48/04 455/433 |
| 2018/0035420 A1* | 2/2018 | Centonza ............ H04W 72/048 |

FOREIGN PATENT DOCUMENTS

JP    2012-503920 A    2/2012

OTHER PUBLICATIONS

3GPP TS 29.272 V15.2.0, 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol, (Release 15), Dec., 2017, pp. 1-165.
3GPP TS 29.229 V14.2.0, 3rd Generation Partnership Project; Technical Specification Group Core Network and Terminal; Cx and Dx interfaces based on the Diameter protocol; Protocol details (Release 14), Jun. 2017, pp. 1-41.

* cited by examiner

*Primary Examiner* — Phuongchau Ba Nguyen
(74) *Attorney, Agent, or Firm* — Sughrue Mion, PLLC

(57) ABSTRACT

To perform a user process such as access restriction and priority control, for each user depending on an area where the user is located, a first core network node includes: a memory storing instructions; and one or more processors configured to execute the instructions to: receive, from a second core network node association information including service attribute information and area identification information associated with each other, the area identification information indicating an area where processing indicated by the service attribute information is performed, the association information being preset per terminal apparatus basis; and perform control on the terminal apparatus 300 in accordance with the association information.

7 Claims, 11 Drawing Sheets

| Update Location Answer | | | |
|---|---|---|---|
| Information Element Name | Mapping to Diameter AVP | Cat. | Description |
| Supported Features (See 3GPP TS 29.229[9]) | Supported-Features | O | |
| Result (See 7.4) | Result-Code / Experimental-Result | M | |
| ULA-Flags (See 7.3.8) | ULA-Flags | C | |
| Subscription Data (See 7.3.2) | Subscription-Data | C | |
| Area-List | Area Group | O | The pre-defined area where MME execute a pre-defined function. |
| User Process Index | User Process | O | The pre-defined user process which MME or eNB execute. |

Figure 7

CORE NETWORK NODE, BASE STATION AND METHOD FOR CONTROLLING TERMINAL APPARATUS

BACKGROUND

Technical Field

The present invention pertains to an apparatus related to a core network node, a base station and a method for controlling a terminal apparatus.

Background Art

In Third Generation Partnership Project (3GPP), Long Term Evolution (LTE) adopting Orthogonal Frequency Division Multiple Access (OFDMA) and Single Carrier Frequency Division Multiple Access (SC-FDMA) is standardized.

PTL 1 discloses a technique where, when a Home eNB or the like receives a message for attempting a connection from a User Equipment (UE), the Home eNB or the like delivers a message to a Mobility Management Entity (MME) so that the MME determines, on the basis of a white list, whether the UE is allowed to connect to the Home eNB or the like.

[PTL 1] JP 2012-503920 T
[NPL 1] 3GPP TS29.272 v.15.2.0, December, 2017, pp. 15-16

SUMMARY

However, LTE does not specify a procedure for user control processing, such as access restriction and priority control, for each user depending on an area where the user is located. The same problem may occur in a system that conforms to a communication standard other than LTE, such as 5th Generation (5G) system.

The technique disclosed in the above-described PTL 1 only determines whether a user connection is allowed or not, which is only managed by an MME.

The example object of the present invention is to provide a core network node and a base station that can perform a user process, such as access restriction and priority control, for each user depending on an area where the user is located.

A core network node according to an example aspect of the present invention is a first core network node, and includes: a memory storing instructions; and one or more processors configured to execute the instructions to: receive, from a second core network node, association information including service attribute information and area identification information associated with each other, the area identification information indicating an area where processing indicated by the service attribute information is performed, the association information being preset per terminal apparatus basis; and perform control on the terminal apparatus in accordance with the association information.

A base station according to an example aspect of the present invention includes: a memory storing instructions; and one or more processors configured to execute the instructions to: receive, from a core network node, association information including service attribute information and area identification information associated with each other along with an SLAP-ID of a terminal apparatus, the area identification information indicating an area where processing indicated by the service attribute information is performed, the association information being preset per terminal apparatus basis; and perform control on the terminal apparatus in accordance with the association information.

A method for controlling a terminal apparatus according to an example aspect of the present invention includes: receiving, from a core network node, association information including service attribute information and area identification information associated with each other, the area identification information indicating an area where processing indicated by the service attribute information is performed, the association information being preset per terminal apparatus basis; and performing control on the terminal apparatus in accordance with the association information.

According to the present invention, it is possible to perform a user process, such as access restriction and priority control, for each user depending on an area where the user is located. Note that, according to the present invention, instead of or together with the above effect, other effects may be exerted.

BRIEF DESCRIPTION OF THE DRAWINGS

FIG. 7 is an explanatory diagram for describing information elements (IEs) of an Update Location Answer.

DESCRIPTION OF THE EXAMPLE EMBODIMENTS

Figure 1:
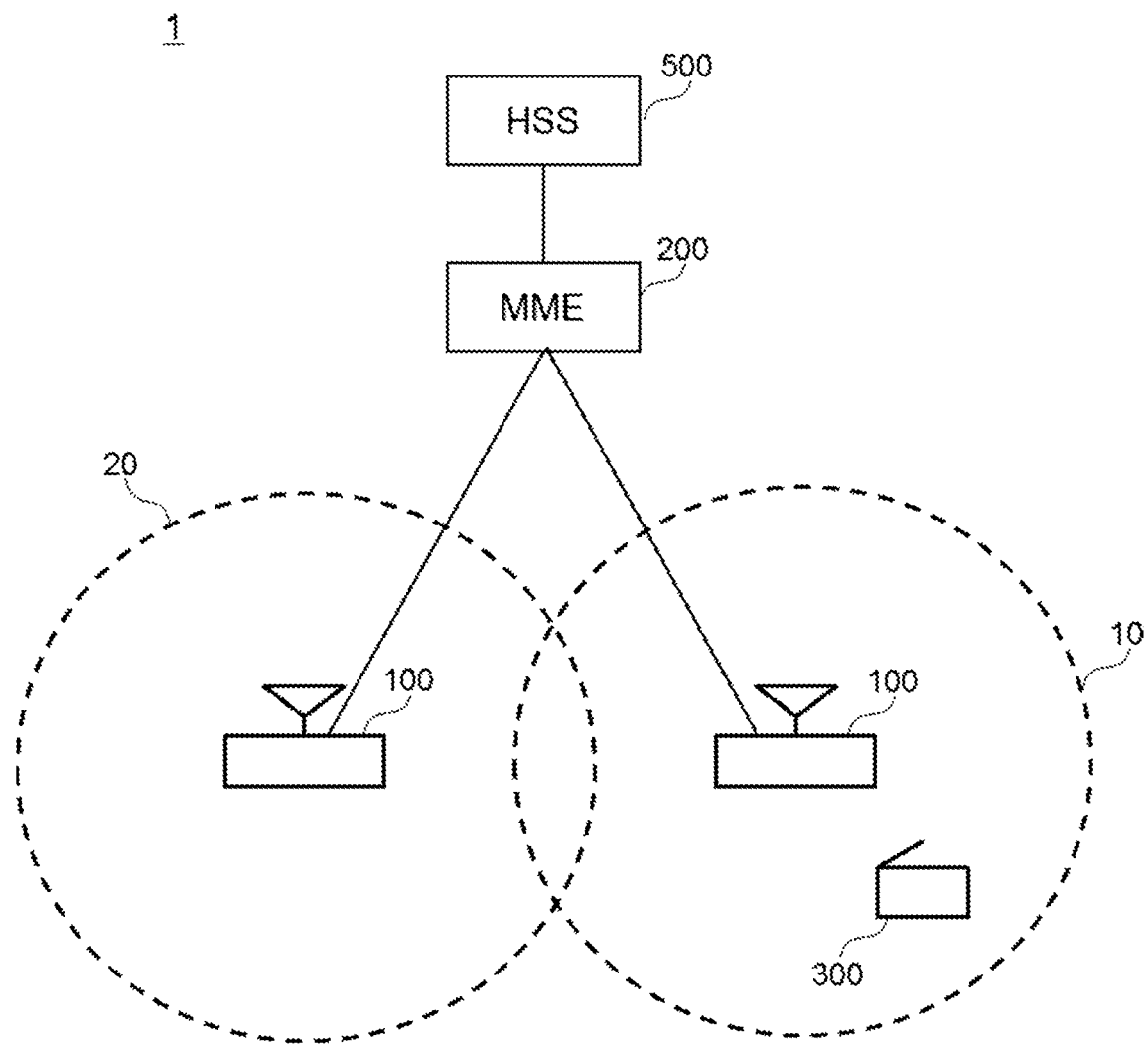
FIG. 1 is an explanatory diagram illustrating an example of a schematic configuration of a system 1 according to example embodiment(s) of the present invention.

Hereinafter, example embodiments of the present invention will be described in detail with reference to the accompanying drawings. Note that, in the Specification and drawings, elements to which the same or similar descriptions are applicable are denoted by the same reference signs, whereby overlapping descriptions may be omitted.

Descriptions will be given in the following order.
1. Overview of Example Embodiments of the Present Invention
2. First Example Embodiment
2.1. Configuration of System 1
2.2. Configuration of Base Station 100
2.3. Configuration of MME 200
2.4. Configuration of Terminal Apparatus 300
2.5. Configuration of HSS 500
2.6. Technical Features
3. Second Example Embodiment
3.1. Configuration of MME 600
3.2. Technical Features
4. Third Example Embodiment
4.1. Configuration of Base Station 700
4.2. Technical Features
5. Other Example Embodiments 1. Overview of Example Embodiments of the Present Invention First, an overview of example embodiments of the present invention will be described.

(1) Technical Problems

LTE does not specify a procedure for user process, such as access restriction and priority control, for each user depending on an area where the user is located, and thus such processing is not performed. The technique disclosed in the above-described PTL 1 only determines whether a user connection is allowed or not, which is only managed by an MME.

The example object of the example embodiment of the present invention is to provide a core network node and a base station that can perform a user process, such as access restriction and priority control, for each user depending on an area where the user is located.

(2) Technical Features

In an example embodiment of the present invention, a core network node serves as a first core network node, and the core network node includes:

a first communication processing unit configured to receive, from a second core network node, association information including service attribute information and area identification information associated with each other, the area identification information indicating an area where processing indicated by the service attribute information is performed, the association information being preset per terminal apparatus basis; and a second communication processing unit configured to perform control on the terminal apparatus in accordance with the association information.

In an example embodiment of the present invention, a base station includes:

a first communication processing unit configured to receive, from a core network node, association information including service attribute information and area identification information associated with each other along with an S1AP-ID of a terminal apparatus, the area identification information indicating an area where processing indicated by the service attribute information is performed, the association information being preset per each terminal apparatus basis; and a second communication processing unit configured to perform control on the terminal apparatus in accordance with the association information.

With each configuration, it is possible to perform a user process, such as access restriction and priority control, for each user depending on an area where the user is located.

Note that the above-described technical features are concrete examples of the example embodiments of the present invention, and, of course, the example embodiments of the present invention are not limited to the above-described technical features.

2. First Example Embodiment

Next, a description will be given of a first example embodiment of the present invention with reference to FIG. 1 to FIG. 9.

<2.1. Configuration of System 1>

With reference to FIG. 1, an example of a configuration of a system 1 according to the first example embodiment will be described. FIG. 1 is an explanatory diagram illustrating an example of a schematic configuration of the system 1 according to the first example embodiment. With referent to FIG. 1, the system 1 includes a base station 100, a MME (first core network node) 200, a Home Subscriber Server (HSS, second core network node) 500, and a terminal apparatus 300. The system 1 may include a plurality of base stations 100, and two base stations 100 are illustrated in FIG. 1.

For example, the system 1 may be a system conforming to Third Generation Partnership Project (3GPP) standards. More specifically, for example, the system 1 may be a system conforming to LTE/LTE-Advanced standards/specifications. Alternatively, the system 1 may be a system conforming to LTE/LTE-Advanced and/or the System Architecture Evolution (SAE) standards/specifications, or to fifth generation (5G)/New Radio (NR) standards/specifications. The system 1 is, of course, not limited to these examples.

(1) Base Station 100

The base station 100 is a node configured to perform wireless communication with the terminal apparatus 300 and is a node in a radio access network (RAN) in other words. For example, the base station 100 may be an eNB, a generation Node B (gNB) in 5G, a Node B in 3G and/or a radio network controller (RNC). The base station 100 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node). In this case, the base station 100 may be one of the plurality of units described above (e.g., one of the first unit and the second unit) and may be connected to another one of the plurality of units (e.g., the other one of the first unit and the second unit).

(2) MME 200

The MME 200 accommodates the base stations 100. The MME 200 is a node configured to provide mobility control and the like.

(3) Terminal Apparatus 300

The terminal apparatus 300 performs wireless communication with a base station 100. For example, when the terminal apparatus 300 is located in the coverage area of a base station 100, the terminal apparatus 300 performs wireless communication with that base station 100. For example, the terminal apparatus 300 is a UE.

(4) HSS 500

The HSS 500 is, for example, a server configured to manage subscriber information related to the terminal apparatus 300.

Specifically, the HSS 500 stores, for each terminal apparatus 300, association information including service attribute information and area identification information associated with each other, the area identification information indicating an area where processing indicated by the service attribute information is performed. The association information can be set in advance. The association information will be described later in detail.

<2.2. Configuration of Base Station 100>

Figure 2:
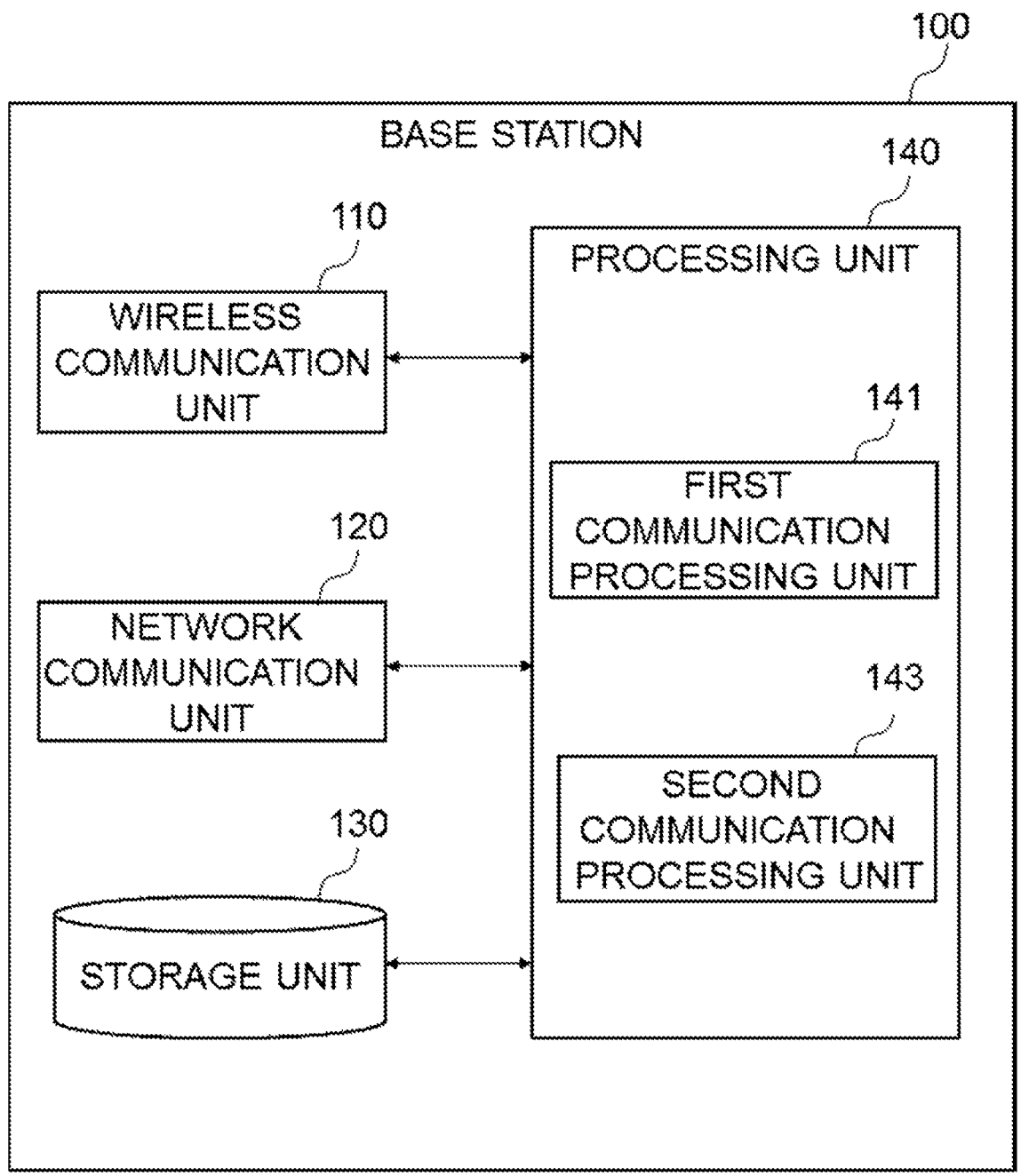
FIG. 2 is block diagram illustrating an example of a schematic configuration of a base station 100 according to a first example embodiment.

First, with reference to FIG. 2, an example of a configuration of the base station 100 according to the first example embodiment is described. FIG. 2 is a block diagram illustrating an example of a schematic configuration of the base station 100 according to the first example embodiment. According to FIG. 2, the base station 100 includes a wireless communication unit 110, a network communication unit 120, a storage unit 130, and a processing unit 140.

(1) Wireless Communication Unit 110

The wireless communication unit 110 transmits and/or receives a signal wirelessly. For example, the wireless communication unit 110 receives a signal from the terminal apparatus 300 and transmits a signal to the terminal apparatus 300.

(2) Network Communication Unit 120

The network communication unit 120 receives a signal from the network and transmits a signal to the network.

(3) Storage Unit 130

The storage unit 130 temporarily or permanently stores programs and parameters for operations of the base station 100 as well as various data.

(4) Processing Unit 140

The processing unit 140 provides various functions of the base station 100. The processing unit 140 includes a first communication processing unit 141 and a second communication processing unit 143. Note that the processing unit 140 may further includes constituent elements other than these constituent elements. In other words, the processing unit 140 may also perform operations other than the operations of these constituent elements. Concrete operations of the first communication processing unit 141 and the second communication processing unit 143 will be described later in detail.

For example, the processing unit 140 (first communication processing unit 141) communicates with another network node (e.g., MME 200) via the network communication unit 120. For example, the processing unit 140 (second communication processing unit 143) communicates with a terminal apparatus (e.g., the terminal apparatus 300) via the wireless communication unit 110.

(5) Implementation Example

The wireless communication unit 110 may be implemented with an antenna, a high frequency (Radio Frequency (RF)) circuit, and the like. The network communication unit 120 may be implemented with a network adapter, a network interface card, or the like. The storage unit 130 may be implemented with a memory (e.g., a nonvolatile memory and/or a volatile memory) and/or a hard disk, and the like. The processing unit 140 may be implemented with a baseband (BB) processor and/or a different processor, and the like. The first communication processing unit 141 and the second communication processing unit 143 may be implemented with the same processor or may be implemented with separate processors. The memory (storage unit 130) may be included in such a processor (chip).

The base station 100 may include a memory configured to store a program and one or more processors that can execute the program, and the one or more processors may perform operations of the processing unit 140 (operations of the first communication processing unit 141 and the second communication processing unit 143). The program may be a program for causing the processor(s) to perform operations of the processing unit 140 (operations of the first communication processing unit 141 and the second communication processing unit 143).

<2.3. Configuration of MME 200>

Figure 3:
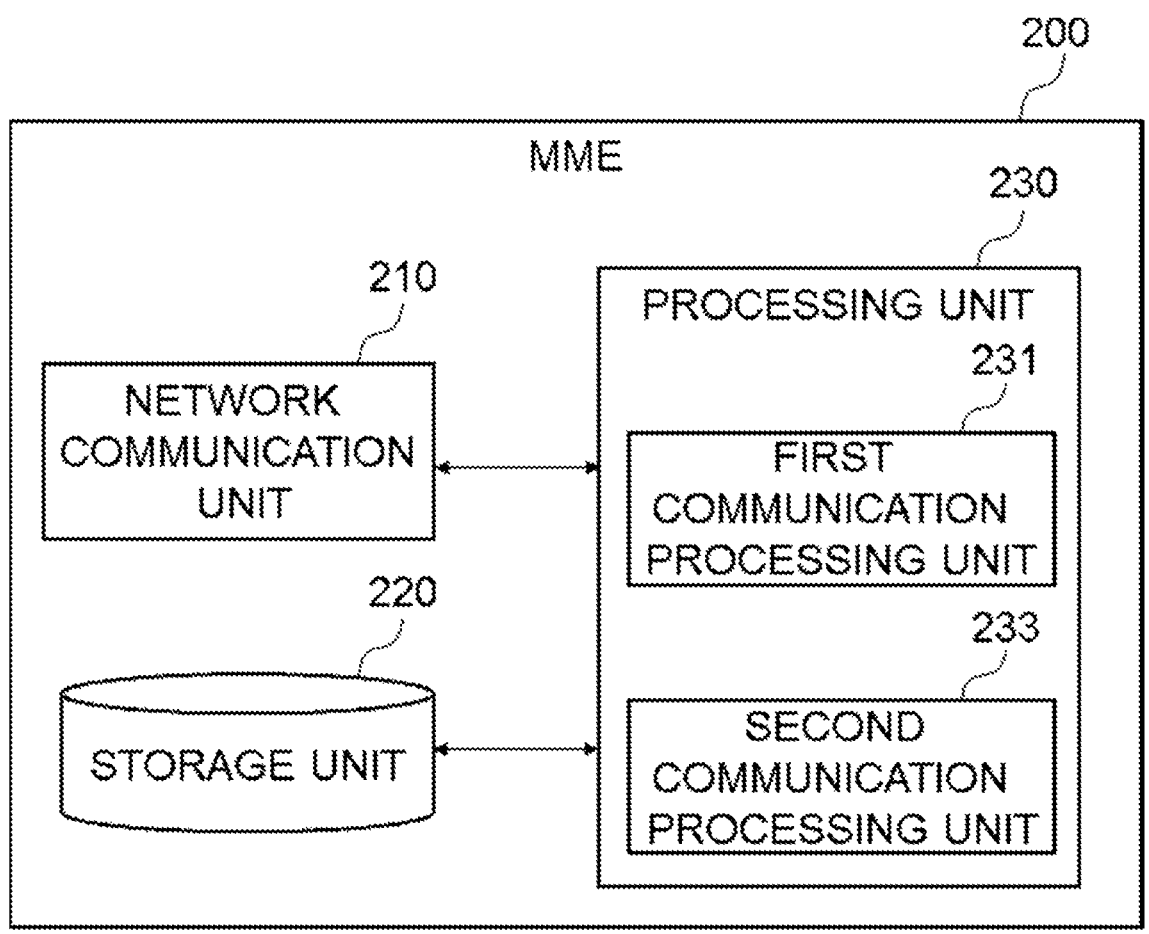
FIG. 3 is a block diagram illustrating an example of a schematic configuration of an MME 200 according to the first example embodiment.

Next, with reference to FIG. 3, an example of a configuration of the MME 200 according to the first example embodiment is described. FIG. 3 is a block diagram illustrating an example of a schematic configuration of the MME 200 according to the first example embodiment. With reference to FIG. 3, the MME 200 includes a network communication unit 210, a storage unit 220, and a processing unit 230.

(1) Network Communication Unit 210

The network communication unit 210 receives a signal from the network and transmits a signal to the network.

(2) Storage Unit 220

The storage unit 220 temporarily or permanently stores programs and parameters for operations of the MME 200 as well as various data.

(3) Processing Unit 230

The processing unit 230 provides various functions of the MME 200. The processing unit 230 includes a first communication processing unit 231 and a second communication processing unit 233. Note that the processing unit 230 may further include constituent elements other than these constituent elements. In other words, the processing unit 230 may also perform operations other than the operations of these constituent elements. Concrete operations of the first communication processing unit 231 and the second communication processing unit 233 will be described later in detail.

For example, the processing unit 230 communicates with another node via the network communication unit 210. Specifically, the processing unit 230 (first communication processing unit 231) communicates with the HSS 500 via the network communication unit 210, for example. Furthermore, for example, the processing unit 230 (second communication processing unit 233) communicates with the base station 100 via the network communication unit 210.

(4) Implementation Example

The network communication unit 210 may be implemented with a network adapter, a network interface card, or the like. The storage unit 220 may be implemented with a memory (e.g., a nonvolatile memory and/or a volatile memory) and/or a hard disk, and the like. The processing unit 230 may be implemented with a processor and the like. The first communication processing unit 231 and the second communication processing unit 233 may be implemented with the same processor or may be implemented with separate processors. The memory (storage unit 220) may be included in such a processor (chip).

The MME 200 may include a memory configured to store a program and one or more processors that can execute the program, and the one or more processors may perform operations of the processing unit 230 (operations of the first communication processing unit 231 and the second communication processing unit 233). The program may be a program for causing the processor(s) to perform operations of the processing unit 230 (operations of the first communication processing unit 231 and the second communication processing unit 233).

<2.4. Configuration of Terminal Apparatus 300>

Figure 4:
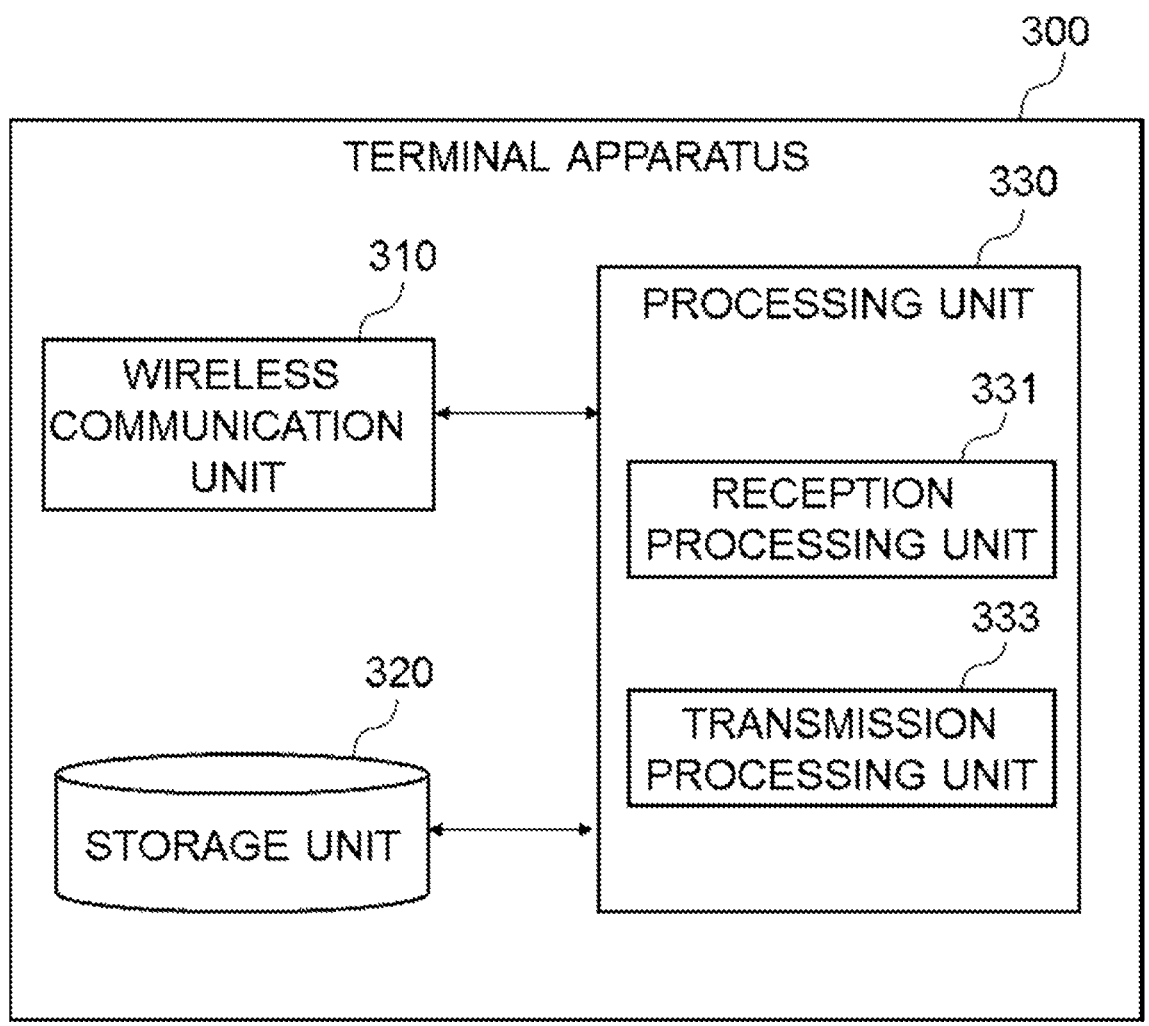
FIG. 4 is a block diagram illustrating an example of a schematic configuration of a terminal apparatus 300 according to the first example embodiment.

Next, with reference to FIG. 4, an example of a configuration of the terminal apparatus 300 according to the first embodiment is described. FIG. 4 is a block diagram illustrating an example of a schematic configuration of the terminal apparatus 300 according to the first example embodiment. According to FIG. 4, the terminal apparatus 300 includes a wireless communication unit 310, a storage unit 320, and a processing unit 330.

(1) Wireless Communication Unit 310

The wireless communication unit 310 wirelessly transmits and/or receives a signal. For example, the wireless communication unit 310 receives a signal from the base station 100 and transmits a signal to the base station 100.

(2) Storage Unit 320

The storage unit 320 temporarily or permanently stores programs and parameters for operations of the terminal apparatus 300 as well as various data.

(3) Processing Unit 330

The processing unit 330 provides various functions of the terminal apparatus 300. The processing unit 330 includes a reception processing unit 331 and a transmission processing unit 333. Note that the processing unit 330 may further include constituent elements other than these constituent elements. In other words, the processing unit 330 may also perform operations other than the operations of these constituent elements.

For example, the processing unit 330 (reception processing unit 331) receives a signal from the base station 100 via the wireless communication unit 310. For example, the processing unit 230 (transmission processing unit 333) transmits a signal to the base station 100 via the wireless communication unit 310. For example, the processing unit 230 (transmission processing unit 333) transmits an access request or TA update request to the MME 200 via the wireless communication unit 310 and the base station 100.

(4) Implementation Example

The wireless communication unit 310 may be implemented with an antenna, a high frequency (Radio Frequency (RF)) circuit, and the like. The storage unit 320 may be implemented with a memory (e.g., a nonvolatile memory and/or a volatile memory) and/or a hard disk, and the like. The processing unit 330 may be implemented with a baseband (BB) processor and/or a different processor, and the like. The reception processing unit 331 and the transmission processing unit 333 may be implemented with the same processor or may be implemented with separate processors. The memory (storage unit 320) may be included in such a processor (chip) or may be provided external to the one or more processors. As an example, the processing unit 330 may be implemented in a system on chip (SoC).

The terminal apparatus 300 may include a memory configured to store a program (instructions) and one or more processors that can execute the program (instructions). The one or more processors may execute the program to perform operations of the processing unit 330 (operations of the reception processing unit 331 and the transmission processing unit 333). The program may be a program for causing the processor(s) to perform operations of the processing unit 330 (operations of the reception processing unit 331 and the transmission processing unit 333).

<2.5. Configuration of HSS 500>

Figure 5:
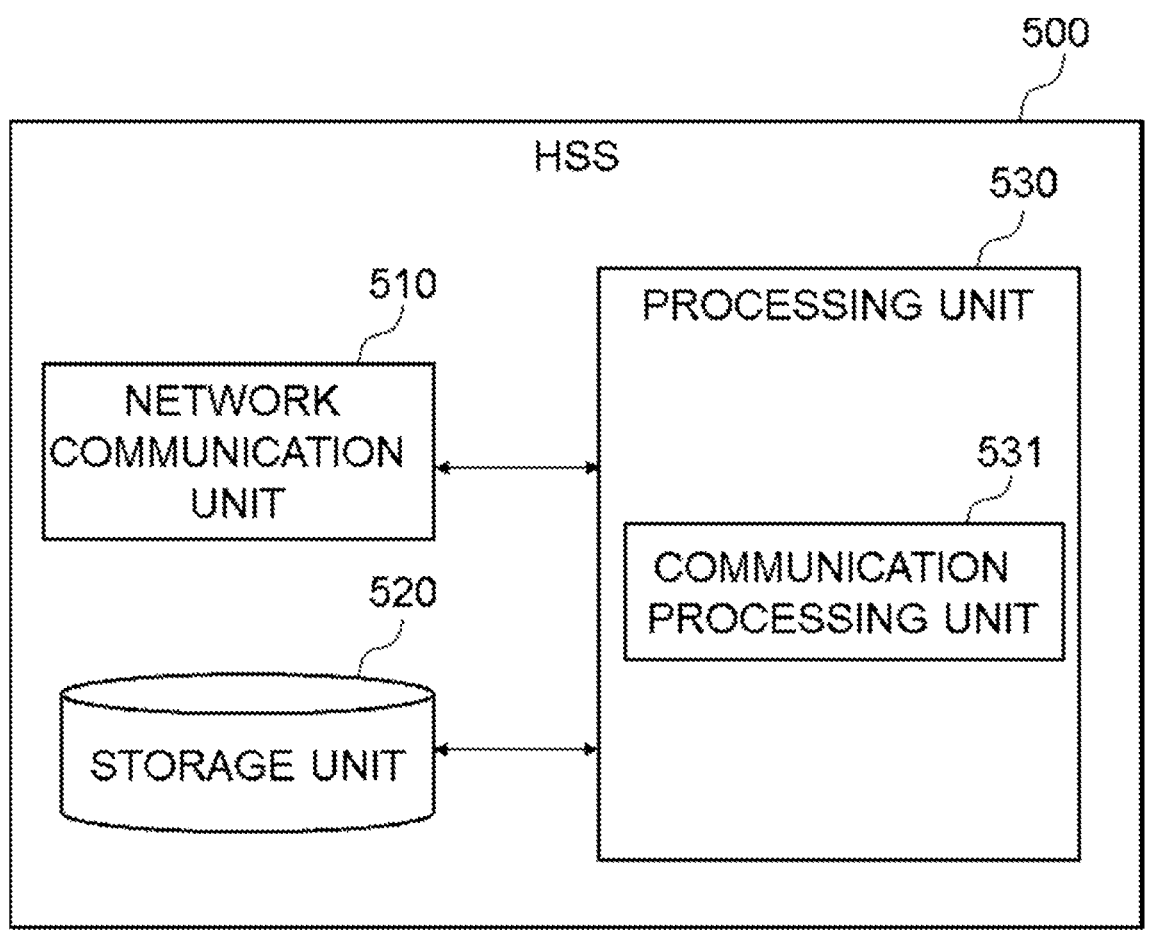
FIG. 5 is a block diagram illustrating an example of a schematic configuration of an HSS 500 according to the first example embodiment.

Next, with reference to FIG. 5, an example of a configuration of the HSS 500 according to the first example embodiment is described. FIG. 5 is a block diagram illustrating an example of a schematic configuration of the HSS 500 according to the first example embodiment. With reference to FIG. 5, the HSS 500 includes a network communication unit 510, a storage unit 520, and a processing unit 530.

(1) Network Communication Unit 510

The network communication unit 510 receives a signal from the network and transmits a signal to the network.

(2) Storage Unit 520

The storage unit 520 temporarily or permanently stores programs and parameters for operations of the HSS 500 as well as various data.

(3) Processing Unit 530

The processing unit 530 provides various functions of the HSS 500. The processing unit 530 includes a communication processing unit 531. Note that the processing unit 530 may further include constituent elements other than the constituent element. In other words, the processing unit 530 may also perform operations other than the operations of the constituent element.

For example, the processing unit 530 communicates with another node via the network communication unit 510. Specifically, the processing unit 530 (communication processing unit 531) communicates with the MME 200 via the network communication unit 510, for example.

(4) Implementation Example

The network communication unit 510 may be implemented with a network adapter, a network interface card, or the like. The storage unit 520 may be implemented with a memory (e.g., a nonvolatile memory and/or a volatile memory) and/or a hard disk, and the like. The processing unit 530 may be implemented with a processor and the like. The memory (storage unit 520) may be included in a processor (chip) of the processing unit 530.

The HSS 500 may include a memory configured to store a program and one or more processors that can execute the program, and the one or more processors may perform operations of the processing unit 530 (operations of the communication processing unit 531). The program may be a program for causing the processor(s) to perform operations of the processing unit 530 (operations of the communication processing unit 531).

<2.6. Technical Features>

The following will describe the technical features of the first example embodiment with reference to FIGS. 6 to 9.

(1) Association Information

Service attribute information that indicates processing (user process) performed per area basis for a terminal apparatus 300 and area identification information that indicates in which area the processing is to be performed are defined in advance. For example, the storage unit 520 of the HSS 500 stores association information that is set in advance for each terminal apparatus 300 and, in the association information, service attribute information is associated with area identification information indicating an area where processing indicated by the service attribute information is performed. In other words, in the storage unit 520, identification information of the terminal apparatus 300 (for example, International Mobile Subscriber Identity: IMSI), the service attribute information, and the area identification information are stored in association with one another.

Service Attribute Information

The service attribute information indicates processing performed per area basis for the terminal apparatus 300. For example, the service attribute information is identification information indicating access restriction processing and/or priority control processing. The service attribute information may also be referred to as user process information.

Area Identification Information

Figure 6:
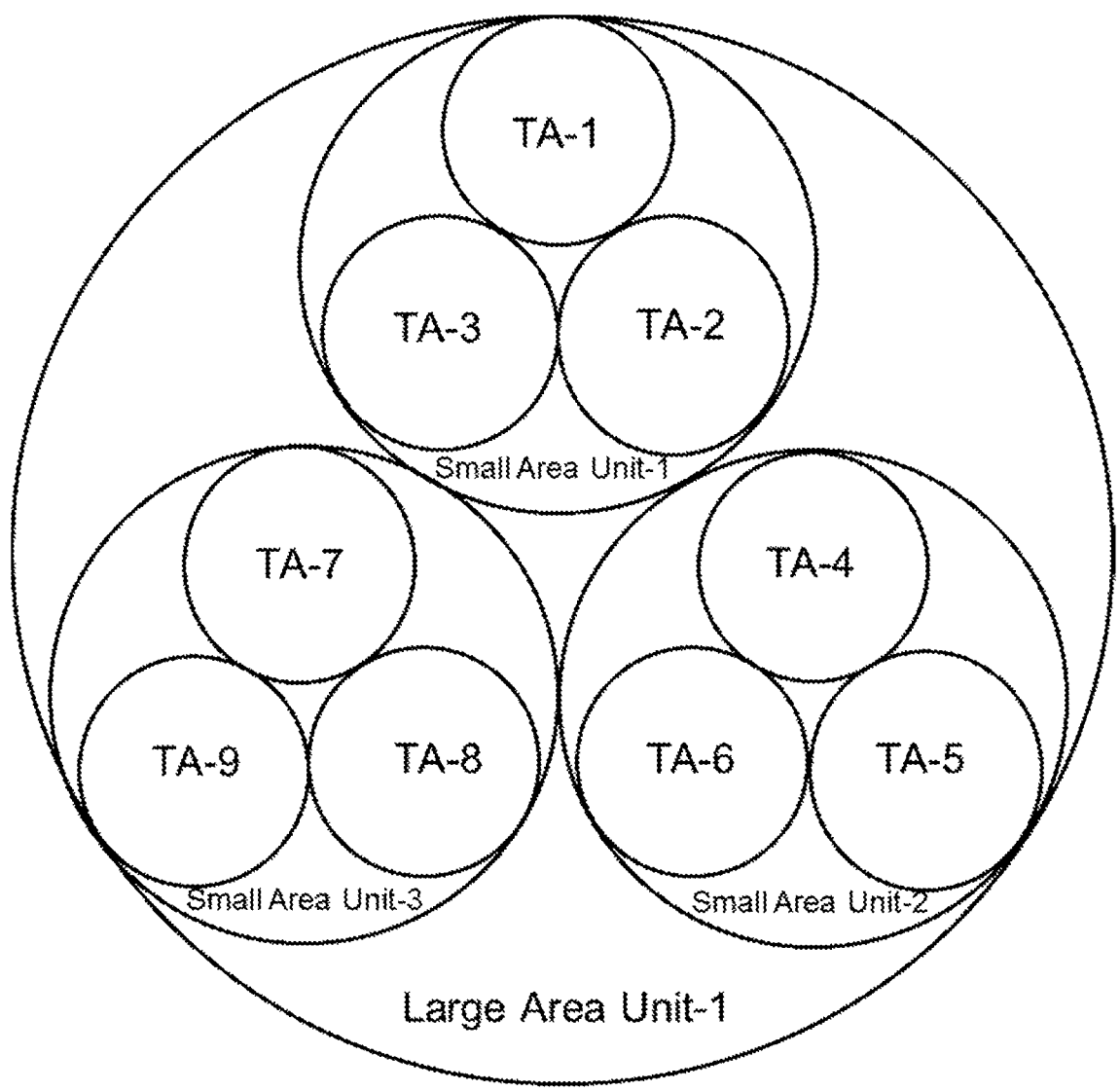
FIG. 6 is an explanatory diagram of areas constituted by Tracking-Areas.

Here, the area may be aggregation of tracking-areas (TAs). FIG. 6 is an explanatory diagram of areas constituted by tracking-areas. In the example of FIG. 6, for example, three TAs constitute a single unit (hereinafter, referred to as a small area unit). Further, three small area units constitute a single unit (hereinafter, referred to as a large area unit). A TA may correspond to a cell served by a base station 100. A single base station 100 may provide a plurality of TAs or a single base station 100 may provide a single TA. In other words, the base station 100 and the TA may represent one-to-many correspondence or one-to-one correspondence. The area identification information is identification information for identifying an area. An area may be defined using geographical information such as longitudes and latitudes. In such a case, the area identification information may indicate, for example, a range of longitudes and latitudes.

(2) Update Location Answer

FIG. 7 is an explanatory diagram for describing information elements (IEs) of an Update Location Answer. The Update Location Answer is described, for example, in 3GPP TS29.272 v. 15.2.0. In the first example embodiment, the Update Location Answer is added with: an Area List that includes area identification information; and a processing index (User Process Index) that indicates control for the terminal apparatus 300 (user process). The Area List indicates an area where an MME 200 performs a predefined function and control, and the Area List is set in advance. The processing index indicates control for the terminal apparatus 300 (user process) that is performed by the MME 200 or the terminal apparatus 300, and the processing index is set in advance.

(3) S1AP-ID

An S1 Application Protocol Identifier (S1AP-ID) is identification information of S1 Application Protocol (S1AP), and the base station 100 links to (makes association with) user information managed by the MME 200 through the S1AP-ID.

(4) Processing Flow

First Processing Example

Figure 8:
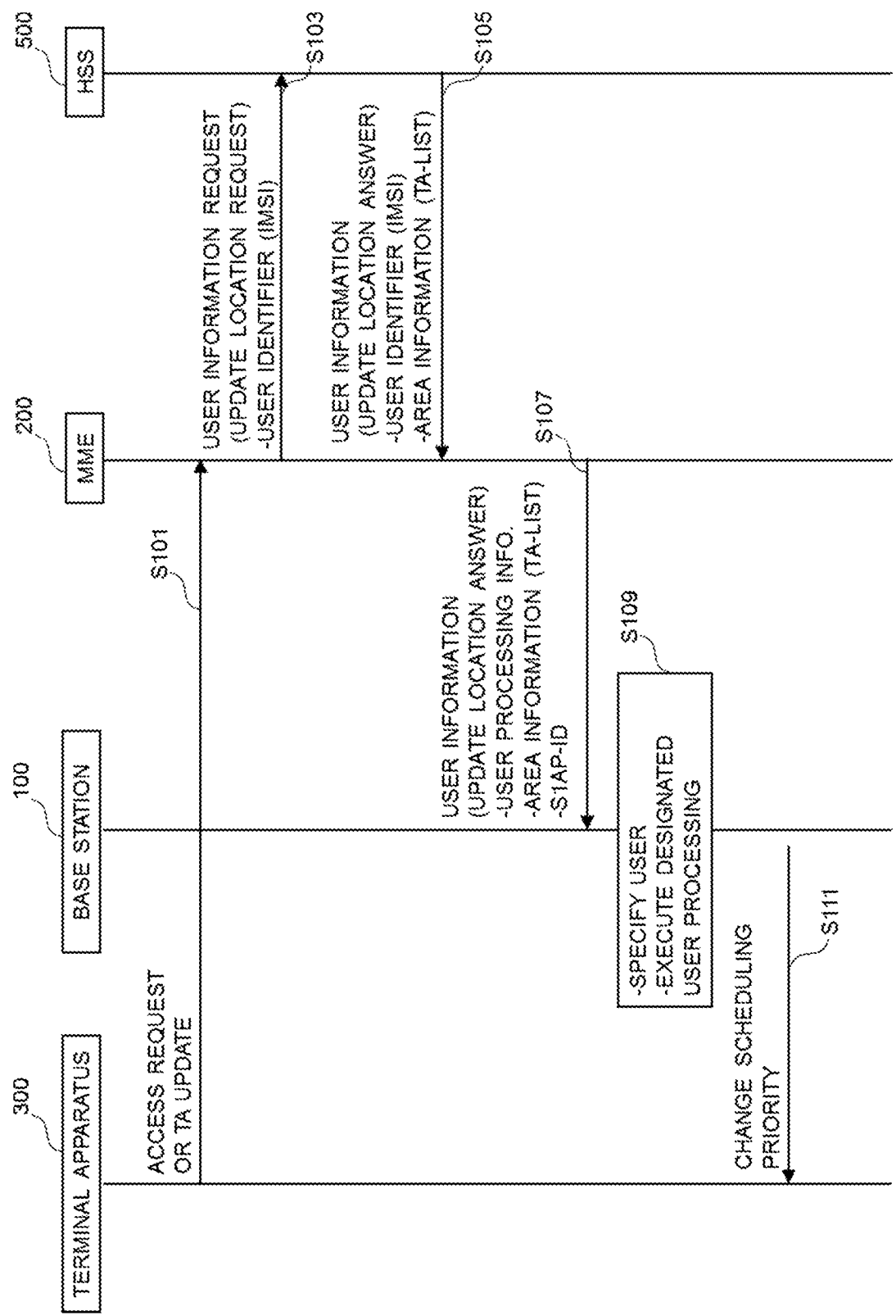
FIG. 8 is a sequence diagram for describing a schematic flow of a first processing example according to the first example embodiment.

With reference to FIG. 8, a first processing example according to the first example embodiment will be described. FIG. 8 is a sequence diagram for describing a schematic flow of the first processing example according to the first example embodiment.

The MME 200 (the second communication processing unit 233) receives an access request or a TA update request from the terminal apparatus 300 through the base station 100 (S101). The MME 200 (the first communication processing unit 231) requests the HSS 500 to provide user information by using an Update Location Request (S103). Here, the Update Location Request includes identification information (for example, IMSI) of the terminal apparatus 300. Note that the Update Location Request is also described, for example, in 3GPP TS29.272 V15.2.0.

When the Update Location Request is received, the HSS 500 (the communication processing unit 531) extracts association information including the service attribute information and the area identification information associated with each other from the storage unit 520, based on the identification information of the terminal apparatus 300 included in the Update Location Request. The HSS 500 (the communication processing unit 531) notifies the MME 200 of an Update Location Answer including the extracted association information (S105). Note that the Update Location Answer may include further user information as necessary.

The MME 200 (the second communication processing unit 233) determines whether the terminal apparatus 300 is located in an area indicated by area identification information (Area List). When the terminal apparatus 300 is determined to be located in an area indicated by the area identification information (Area List), the MME 200 (the second communication processing unit 233) notifies the base station 100 of an ID that is associated with a user, such as the S1AP-ID, and service attribute information (User Process Index) (S107). In this way, the base station 100 can map the terminal apparatus 300 to control on the terminal apparatus 300. Note that the MME 200 (the second communication processing unit 233) may further notify the base station 100 of the area identification information. The MME 200 may add an ID that is associate with a user, such as the S1AP-ID, to the Update Location Answer and transmit the Update Location Answer to the base station 100.

The base station 100 (the second communication processing unit 143) performs control indicated by the service attribute information for the terminal apparatus 300 (S109). For example, the base station 100 performs access restriction, priority control processing, and the like for the terminal apparatus 300. In access restriction, for example, access of the terminal apparatus 300 may be allowed or rejected, but the access restriction is not limited to such processing. In priority control processing, for example, scheduling priority may be changed (S111), but the priority control processing is not limited to such processing. In this way, it is possible to provide a function of performing a user process per area in which the terminal apparatus 300 is located.

On the other hand, when the terminal apparatus 300 is determined not to be located in any area indicated by the area identification information (Area List), the MME 200 terminates the processing and waits for a next access request or the like.

With such a configuration and processing, for example, it is possible to set up areas such that a user can enjoy services in accordance with user payment system or payment plan of the user and to change priority for radio scheduling per area basis.

Note that the above-described processing flow example is only schematically described, and it is to be appreciated that processing, transmission and reception other than the above-described steps S101 to S111 may also be performed in the first example embodiment.

Second Processing Example

Figure 9:
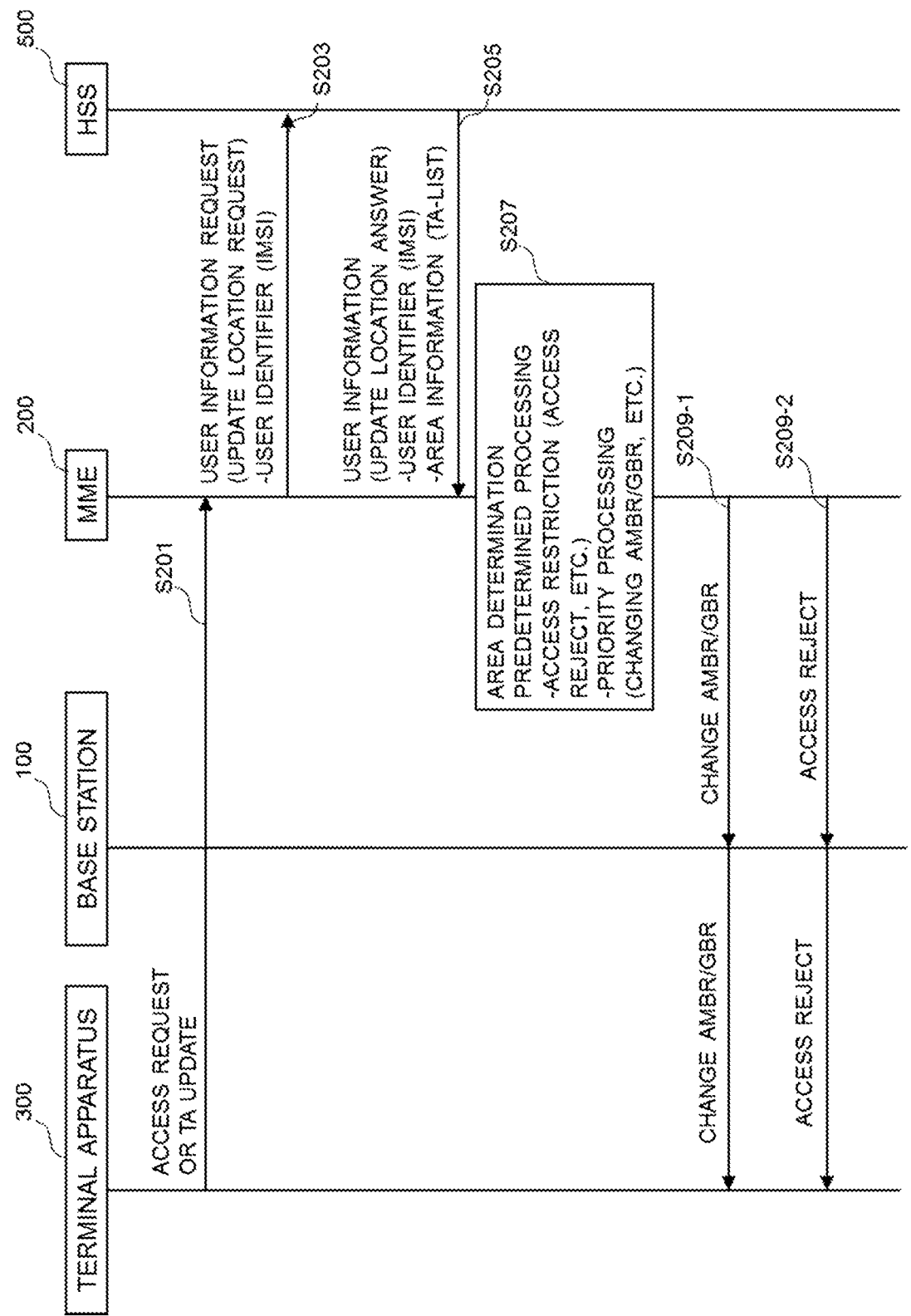
FIG. 9 is a sequence diagram for describing a schematic flow of a second processing example according to the first example embodiment.

With reference to FIG. 9, a second processing example according to the first example embodiment will be described. FIG. 9 is a sequence diagram for describing a schematic flow of the second processing example according to the first example embodiment.

The steps S201 to S205 in the second processing example are similar to steps S101 to S105 in the above-described first processing example and, thus, descriptions thereof are omitted. The MME 200 determines whether the terminal apparatus 300 is located in an area indicated by the area identification information (Area List), and when the terminal apparatus 300 is located in an area indicated by the area identification information (Area List), the MME 200 performs control for the terminal apparatus 300. For example, the MME 200 performs access restriction, priority control processing and the like for the terminal apparatus 300 (S207). In priority control processing, for example, aggregate maximum bit rate (AMBR)/guaranteed bit rate (GBR) may be changed (S209-1), but the priority control processing is not limited to such processing. In access restriction, for example, access of the terminal apparatus 300 may be allowed or rejected (S209-2), but the access restriction is not limited to such processing. In this way, it is possible to provide a function of performing a user process per area in which the terminal apparatus 300 is located.

With such a configuration and processing, for example, it is possible to set up areas such that a user can enjoy services in accordance with user payment system or payment plan of the user and to change priority for radio scheduling per area basis.

3. Second Example Embodiment

Next, with reference to FIG. 10, a second example embodiment of the present invention will be described. The above-described first example embodiment is a concrete example embodiment, whereas the second example embodiment is a more generalized example embodiment.

3.1 Configuration of MME 600

(1) Configuration

Figure 10:
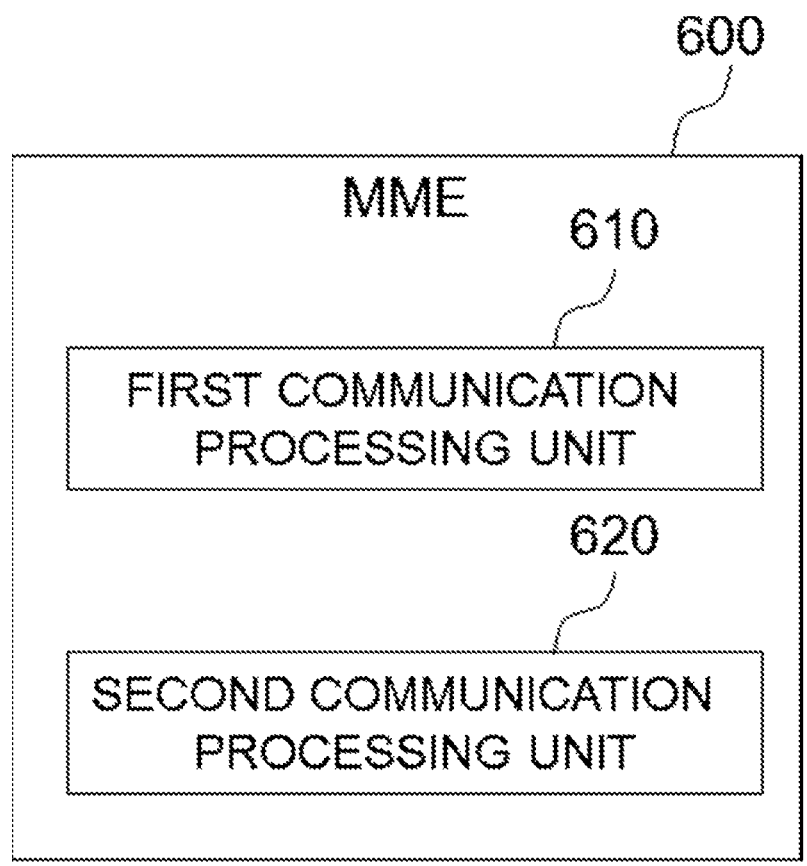
FIG. 10 is a block diagram illustrating an example of a schematic configuration of an MME 600 according to a second example embodiment.

FIG. 10 is a block diagram illustrating an example of a schematic configuration of an MME 600 according to the second example embodiment. With reference to FIG. 10, the MME 600 includes a first communication processing unit 610 and a second communication processing unit 620.

For example, the first communication processing unit 610 communicates with the HSS 500. The first communication processing unit 610 receives, from the HSS (the second core network node) 500, association information that is set in advance for each terminal apparatus 300 and includes service attribute information and area identification information associated with each other, the area identification information indicating an area where processing indicated by the service attribute information is performed.

Further, for example, the second communication processing unit 620 communicates with the base station 100 through the network communication unit 210. The second communication processing unit 620 controls the terminal apparatus 300 in accordance with the association information.

(2) Implementation Example

The first communication processing unit 610 and the second communication processing unit 620 may be implemented with one or more processors, or the like. The first communication processing unit 610 and the second communication processing unit 620 may be implemented with the same processor or may be implemented with separate processors.

The MME 600 may include a memory configured to store a program and one or more processors that can execute the program, and the one or more processors may perform operations of the first communication processing unit 610 and the second communication processing unit 620. The program may be a program for causing the processor(s) to perform the operations of the first communication processing unit 610 and the second communication processing unit 620.

3.5. Technical Features

Technical features of the second example embodiment are similar to the technical features of the first example embodiment and, thus, descriptions of the technical features are omitted.

4. Third Example Embodiment

Figure 11:
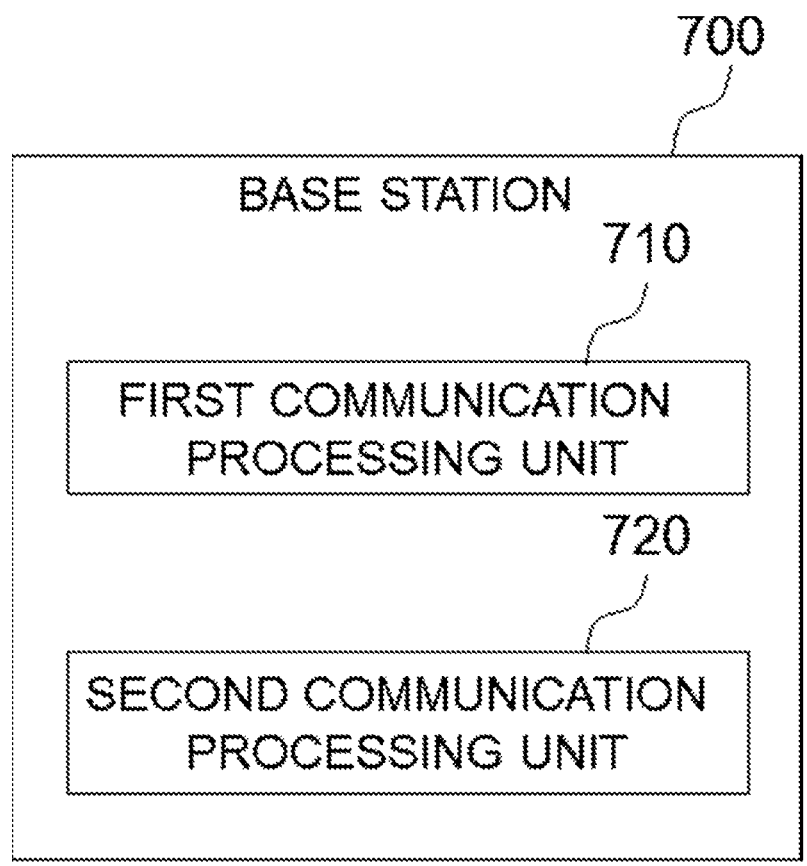
FIG. 11 is a block diagram illustrating an example of a schematic configuration of a base station 700 according to a third example embodiment.

Next, with reference to FIG. 11, a third example embodiment of the present invention is described. The above-described first example embodiment is a concrete example embodiment, whereas the third example embodiment is a more generalized example embodiment.

4.1. Configuration of Base Station 700

(1) Configuration

FIG. 11 is a block diagram illustrating an example of a schematic configuration of a base station 700 according to the third example embodiment. With reference to FIG. 11, the base station 700 includes a first communication processing unit 710 and a second communication processing unit 720.

For example, the first communication processing unit 710 communicates with another network node (e.g., MME 200). The first communication processing unit 710 is configured to receive, from a HSS (a second core network node) 500, association information including service attribute information and area identification information associated with each other, the area identification information indicating an area where processing indicated by the service attribute information is performed, the association information being preset per terminal apparatus basis, along with an S1AP-ID of the terminal apparatus 300.

In addition, for example, the second communication processing unit 620 is configured to communicate with the terminal apparatus (e.g., terminal apparatus 300). The second communication processing unit 620 is configured to perform control on the terminal apparatus 300 in accordance with the association information.

(2) Implementation Example

The first communication processing unit 710 and the second communication processing unit 720 may be implemented with a baseband (BB) processor and/or a different processor, or the like. The first communication processing unit 710 and the second communication processing unit 720 may be implemented with the same processor or may be implemented with separate processors.

The base station 100 may include a memory configured to store a program and one or more processors that can execute the program, and the one or more processors may perform operations of the first communication processing unit 710 and the second communication processing unit 720. The program may be a program for causing the processor(s) to perform the operations of the first communication processing unit 710 and the second communication processing unit 720.

4.2. Technical Features

Technical features of the third example embodiment are similar to the technical features of the first example embodiment and, thus, descriptions of the technical features are omitted.

5. Other Example Embodiments

Descriptions have been given above of the example embodiments of the present invention. However, the present invention is not limited to these example embodiments. It is to be understood by those of ordinary skill in the art that these example embodiments are merely examples and that various alterations are possible without departing from the scope and the spirit of the present invention.

For example, the steps in any processing described in the Specification need not be performed chronologically in the order illustrated in the corresponding sequence diagram. For example, the steps of the processing may be performed in a different order from the order illustrated as the corresponding sequence diagram or may be performed in parallel. Moreover, one or some of the steps of the processing may be deleted, or one or more steps may be added to the processing.

An apparatus including constituent element(s) of the base station described in the Specification (e.g., the first communication processing unit and/or the second communication processing unit) (e.g., one or more apparatuses (or units) among a plurality of apparatuses (or units) constituting the base station or a module for one of the plurality of apparatuses (or units)) may be provided. An apparatus including the constituent element(s) of the terminal apparatus described in the Specification (e.g., the reception processing unit and/or the transmission processing unit) (e.g., a module for the terminal apparatus) may be provided. Moreover, methods including processing of the constituent element(s) may be provided, and programs or program products for causing a processor to execute processing of the constituent element(s) may be provided. Moreover, a non-transitory computer-readable recording medium (non-transitory computer readable recording medium) recording the program may be provided. It is apparent that such apparatuses, modules, methods, programs, and a non-transitory computer-readable recording medium are also included in the present invention.

The whole or part of the example embodiments disclosed above can be described as, but not limited to, the following supplementary notes.

(Supplementary Note 1)

A core network node being a first core network node, the core network node comprising:

a first communication processing unit configured to receive, from a second core network node, association information including service attribute information and area identification information associated with each other, the area identification information indicating an area where processing indicated by the service attribute information is performed, the association information being preset per terminal apparatus basis; and a second communication processing unit configured to perform control on the terminal apparatus in accordance with the association information.

(Supplementary Note 2)

The core network node according to Supplementary Note 1, wherein the second communication processing unit is configured to add S1 Application Protocol-Identifier (S1AP-ID) to the association information received from the second core network node, and transmit the association information to a base station serving the terminal apparatus, to cause the base station to perform control on the terminal apparatus in accordance with the association information.

(Supplementary Note 3)

The core network node according to Supplementary Note 1 or 2, wherein the second communication processing unit is configured to receive an access request or a Tracking Area update request from the terminal apparatus through a base station, and the first communication processing unit is configured to
request the second core network node to provide the association information with regard to the terminal apparatus, based on the access request or the Tracking Area update request from the terminal apparatus, and
receive the association information with regard to the terminal apparatus from the second core network node.

(Supplementary Note 4)

The core network node according to any one of Supplementary Notes 1 to 3, wherein control on the terminal apparatus includes performing processing indicated by the service attribute information when the terminal apparatus is located in an area indicated by the area identification information.

(Supplementary Note 5)

The core network node according to any one of Supplementary Notes 1 to 4, wherein control on the terminal apparatus includes processing of changing priority of radio scheduling.

(Supplementary Note 6)

The core network node according to any one of Supplementary Notes 1 to 5, wherein the core network node is a Mobility Management Entity (MME) and the second core network node is a Home Subscriber Server (HSS).

(Supplementary Note 7)

A base station comprising:

a first communication processing unit configured to receive, from a core network node, association information including service attribute information and area identification information associated with each other along with an S1AP-ID of a terminal apparatus, the area identification information indicating an area where processing indicated by the service attribute information is performed, the association information being preset per terminal apparatus basis; and a second communication processing unit configured to perform control on the terminal apparatus in accordance with the association information.

(Supplementary Note 8)

A method for controlling a terminal apparatus, the method comprising:

receiving, from a core network node, association information including service attribute information and area identification information associated with each other, the area identification information indicating an area where processing indicated by the service attribute information is performed, the association information being preset per terminal apparatus basis; and performing control on the terminal apparatus in accordance with the association information.

(Supplementary Note 9)

A program causing a computer to execute the steps of:

receiving, from a core network node, association information including service attribute information and area identification information associated with each other, the area identification information indicating an area where processing indicated by the service attribute information is performed, the association information being preset per terminal apparatus basis; and performing control on the terminal apparatus in accordance with the association information.

(Supplementary Note 10)

A non-transitory computer-readable recording medium having recorded thereon a program causing a computer to execute the steps of:

receiving, from a core network node, association information including service attribute information and area identification information associated with each other, the area identification information indicating an area where processing indicated by the service attribute information is performed, the association information being preset per terminal apparatus basis; and performing control on the terminal apparatus in accordance with the association information.

This application claims priority based on Japanese Patent Application No. 2018-059994 filed on Mar. 27, 2018, the entire disclosure of which is incorporated herein.

It is possible to perform a user process, such as access restriction and priority control, for each user depending on an area where the user is located.

What is claimed is:

1. A core network node being a first core network node, the core network node comprising:
   a memory storing instructions; and
   one or more processors configured to execute the instructions to
      receive, from a second core network node, association information including service attribute information and area identification information associated with each other, the association information being preset per terminal apparatus basis, the service attribute information indicating control processing performed for a service provided to respective terminal apparatus, the area identification information indicating an area where the control processing indicated by the service attribute information is performed, wherein the core network node is a Mobility Management Entity (MME) and the second core network node is a Home Subscriber Server (HSS); and
      perform control on the terminal apparatus in accordance with the association information.

2. The core network node according to claim 1, wherein the one or more processors are configured to execute the instructions to
   add S1 Application Protocol-Identifier (S1AP-ID) to the association information received from the second core network node, and transmit the association information to a base station serving the terminal apparatus, to cause the base station to perform control on the terminal apparatus in accordance with the association information.

3. The core network node according to claim 1, wherein the one or more processors are configured to execute the instructions to
   receive an access request or a Tracking Area update request from the terminal apparatus through a base station,
   request the second core network node to provide the association information with regard to the terminal apparatus, based on the access request or the Tracking Area update request from the terminal apparatus, and
   receive the association information with regard to the terminal apparatus from the second core network node.

4. The core network node according to claim 1, wherein control on the terminal apparatus includes performing the control processing indicated by the service attribute information when the terminal apparatus is located in an area indicated by the area identification information.

5. The core network node according to claim 1, wherein control on the terminal apparatus includes processing of changing priority of radio scheduling.

6. A base station comprising:
   a memory storing instructions; and
   one or more processors configured to execute the instructions to
      receive, from a core network node, association information including service attribute information and area identification information associated with each other along with an S1AP-ID of a terminal apparatus, the association information being preset per terminal apparatus basis, the service attribute information indicating control processing performed for a service provided to respective terminal apparatus, the area identification information indicating an area where the control processing indicated by the service attribute information is performed, wherein the core network node is a Mobility Management Entity (MME); and perform control on the terminal apparatus in accordance with the association information.

7. A method for controlling a terminal apparatus, the method comprising:

receiving, from a core network node, association information including service attribute information and area identification information associated with each other, the association information being preset per terminal apparatus basis, the service attribute information indicating control processing performed for a service provided to respective terminal apparatus, the area identification information indicating an area where the control processing indicated by the service attribute information is performed, wherein the core network node is a Mobility Management Entity (MME); and performing control on the terminal apparatus in accordance with the association information.

* * * * *

UNITED STATES PATENT AND TRADEMARK OFFICE
CERTIFICATE OF CORRECTION

Page 1 of 1

PATENT NO. : 10,856,133 B2
APPLICATION NO. : 16/279097
DATED : December 1, 2020
INVENTOR(S) : Kazunari Tomishige It is certified that error appears in the above-identified patent and that said Letters Patent is hereby corrected as shown below:

In the Specification

Column 1, Line 64; Delete "SLAP-ID" and insert --S1AP-ID-- therefor

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*